(12) United States Patent
Liu

(10) Patent No.: US 6,437,929 B1
(45) Date of Patent: Aug. 20, 2002

(54) PIEZO-ACTUATOR BASED OPTICAL ADD/DROP MODULE

(75) Inventor: Yongsheng Liu, San Jose, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/773,212

(22) Filed: Jan. 30, 2001

(51) Int. Cl.[7] .............................. G02B 7/02; G02B 5/04; G02B 7/18
(52) U.S. Cl. ........................................ 359/819; 359/831
(58) Field of Search ................................ 359/811, 819, 359/821, 831, 833, 834, 70

(56) References Cited

U.S. PATENT DOCUMENTS

| | | | | |
|---|---|---|---|---|
| 4,688,907 A | * | 8/1987 | Kleinberg | ................... 359/377 |
| 5,026,222 A | * | 6/1991 | Kawano et al. | ............. 409/225 |
| 5,343,332 A | * | 8/1994 | Oono et al. | .................. 359/837 |

* cited by examiner

Primary Examiner—Georgia Epps
Assistant Examiner—William Choi
(74) Attorney, Agent, or Firm—Fernandez & Associates, LLP

(57) ABSTRACT

An apparatus for mechanical packaging of a piezo-actuator based add/drop module is disclosed. In one aspect of the invention, the combination of an assembly base and an optical add/drop module base provide the alignments for placing triangular prisms and a hexagonal prism. The assembly base has several sets of cylindrical pins where each set of cylindrical pins extends through the OADM base for positioning of a triangular prism or a hexagonal prism. In another aspect of the invention, a set of cylindrical pins extends through the OADM base for placement of a bimorph actuator.

9 Claims, 3 Drawing Sheets

PIEZO-ACTUATOR BASED OPTICAL ADD/DROP MODULE

CROSS-REFERENCE TO RELATED APPLICATIONS

This application relates to co-pending U.S. patent application Ser. No. 09/513,777, entitled "Method and Apparatus for Optical Switching Devices Utilizing a Bi-Morphic Piezoelectric Apparatus" by Shudong Wu et al., owned by the assignee of this application and incorporated herein by reference.

This application relates to a co-pending U.S. patent application Ser. No. 09/752,177, entitled "Method and Apparatus for Latched Bimorph Optical Switches" by Shuaong Wu, owned by the assignee of this application and incorporated herein by reference.

BACKGROUND INFORMATION

1. Field of the Invention

The present invention relates to the field of optical devices, and more particularly to assembly of an optical add/drop module.

2. Description of Related Art

Fiber optics transmission is now a common platform for transporting voice, data, and images. As the demand for data carrying capacity continues to increase, optical companies are finding techniques to utilize the bandwidth of existing fiber-optic cable more efficiently. An established technique for increasing the carrying capacity of existing fiber cable is Wavelength Division Multiplexing (WDM) in which multiple information channels are independently transmitted over the same fiber using multiple wavelengths of light. In this practice, each light-wave-propagated information channel corresponds to light within a specific wavelength range or "band".

Due to the increase network traffic resulting from the use of the WDM technique, companies are designing sophisticated optical switching devices which can quickly route numerous channels among various optical communications lines. In these instances, an optical Add/Drop module is required.

Conventional solutions in manufacturing an optical switching device requires precision positioning an optical component to an assembly package. It is usually required to precision machine the package, as well as actively align an optical components. This approach is cumbersome and costly, thereby reducing the overall throughput in the quantity of manufactured devices. Accordingly, the present invention addresses these needs.

SUMMARY OF THE INVENTION

The present invention provides an apparatus for a mechanical package of a piezo-actuator based add/drop module. In one aspect of the invention, the combination of an assembly base and an optical add/drop module base provide the alignments for placing triangular prisms and a hexagonal prism. The assembly base has several sets of cylindrical pins where each set of cylindrical pins extends through the OADM base for positioning of a triangular prism or a hexagonal prism. In another aspect of the invention, a set of cylindrical pins extends through the OADM base for placement of a bimorph actuator.

Advantageously, the present invention provides an intelligent mechanical solution in solving the alignment problems associated with packaging an OADM and piezo-acututor. The invention avoids manual intensive labor in aligning triangular and hexagonal prisms. The invention further avoids using expensive techniques, such as robotic automation, to align a switching optical device.

DETAILED DESCRIPTION OF PREFERRED EMBODIMENT(S)

Figure 1:
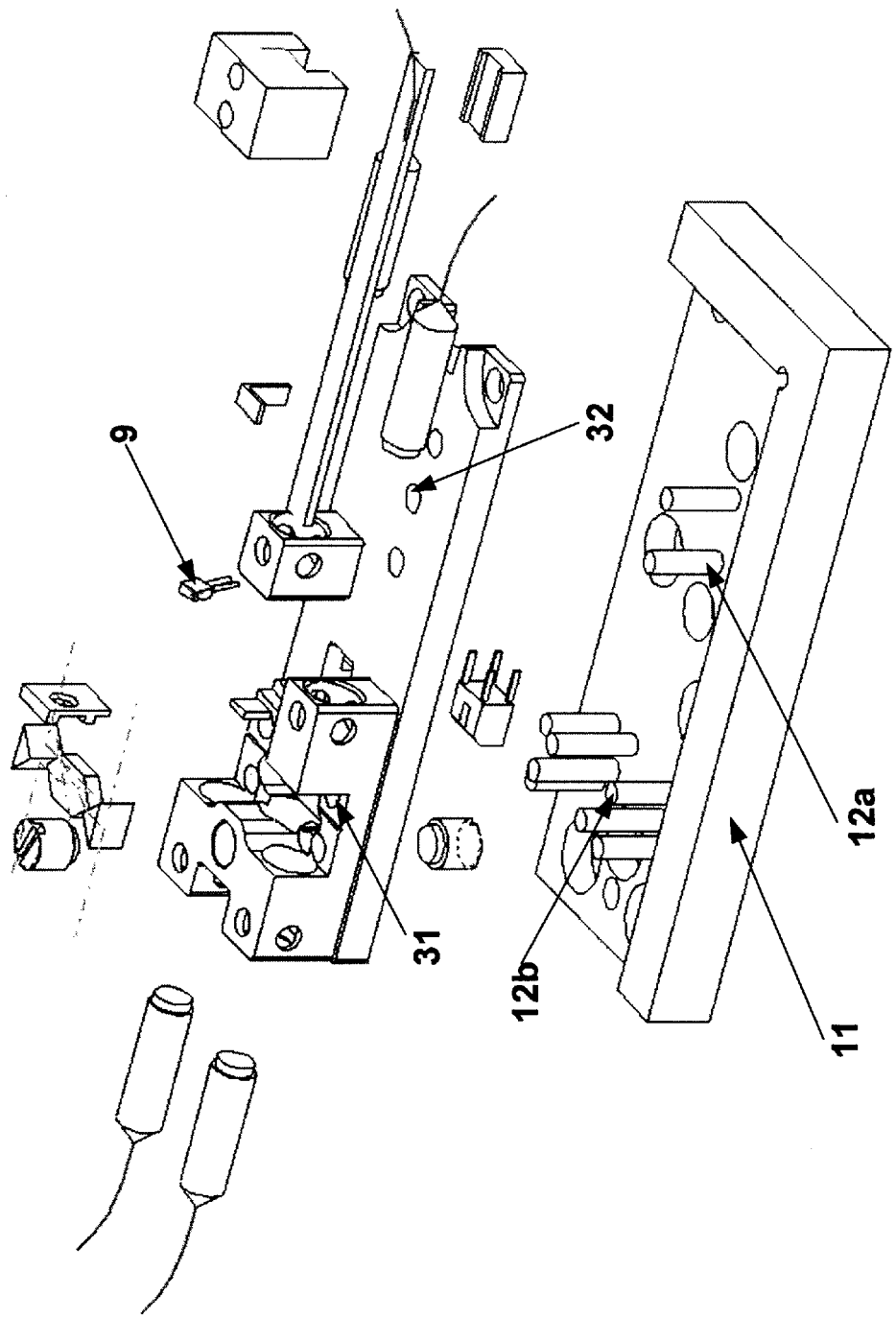
FIG. 1 is a pictorial diagram illustrating an exploded view of an OADM base on an assembly base for placement and alignment of an optical switching device in accordance with the present invention.

FIG. 1 shows an exploded view of an OADM base 20 on an assembly base 10 for placement and alignment of an optical switching device 30. The assembly base 10 has three sets of cylindrical pins extending vertically from a platform 11. The first set of cylindrical pins 12 includes three cylindrical pins, and the second set of cylindrical pins 13 includes four cylindrical pins. The third set of cylindrical pins 14 has two pins for alignment of a bimorph actuator.

The OADM base 20 has corresponding sets of holes for extending the first, second, and third sets of cylindrical pins 12, 13, and 14 through the OADM base 20. The OADM base 20 is aligned to the assembly base 10 for placement of optical components by the first set of cylindrical pins 12, and the second set of cylindrical pins 13. When the OADM base 20 is mounted on the assembly base 10, the optical switching device 30 is placed on the OADM base 20. In this embodiment, the switching device 30 is implemented with a triangular prism 31, a triangular prism 32, and a hexagonal prism 33. The triangular prism 31, the triangular prism 32, and the hexagonal prism 33 are aligned by the placement according to the first and second sets of cylindrical pins 12 and 13. The functionality of the OADM module is detailed in co-pending patent application Ser. No. 09/752,173, entitled "Method and Apparatus for Latched Bimorph Optical Switches" by Shudong Wu, owned by the assignee of this application and incorporated herein by reference.

The alignment of the triangular prism 31 is performed by the positioning of the first set of cylindrical pins 12, where a first, second, and third cylindrical pins 12a, 12b, and 12c are tangential to the two sides of the triangular prism 31 that form a right angle. The alignment of the triangular prism 32 is performed by the positioning of the second set of cylindrical pins 13, where a fourth, fifth, and sixth, cylindrical pins 13a, 13b, and 13c, are tangential to the two sides of the triangular prism 32 that form a right angle. The alignment of the hexagonal prism 33 is done by positioning the second, fifth, and seventh cylindrical pins 12b, 13b, and 13d that extend through the holes in the OADM base 20 being in contacts with the hexagonal prism.

The cylindrical or assembly pins 12a, 12b, 12c, 13a, 13b, 13c, and 13d are mechanically machined on the assembly base with high precision. The use of alignment pins significantly simplifies the alignment process for positioning the prisms and the piezo-actuator. The prisms and piezo-actuator are tangent contact with the edges of prisms and piezo-actuator, and mounted directly on the OADM base 20. After the prisms and piezo-actuator are mounted, the OADM base 20 can be removed from the assembly base to the next alignment stage, i.e., actively align the collimators to the OADM base 20. Thus, the machining precision for the OADM can be significantly loose. The assembly base can be re-used, thus, the cost can be reduced.

Figure 2:
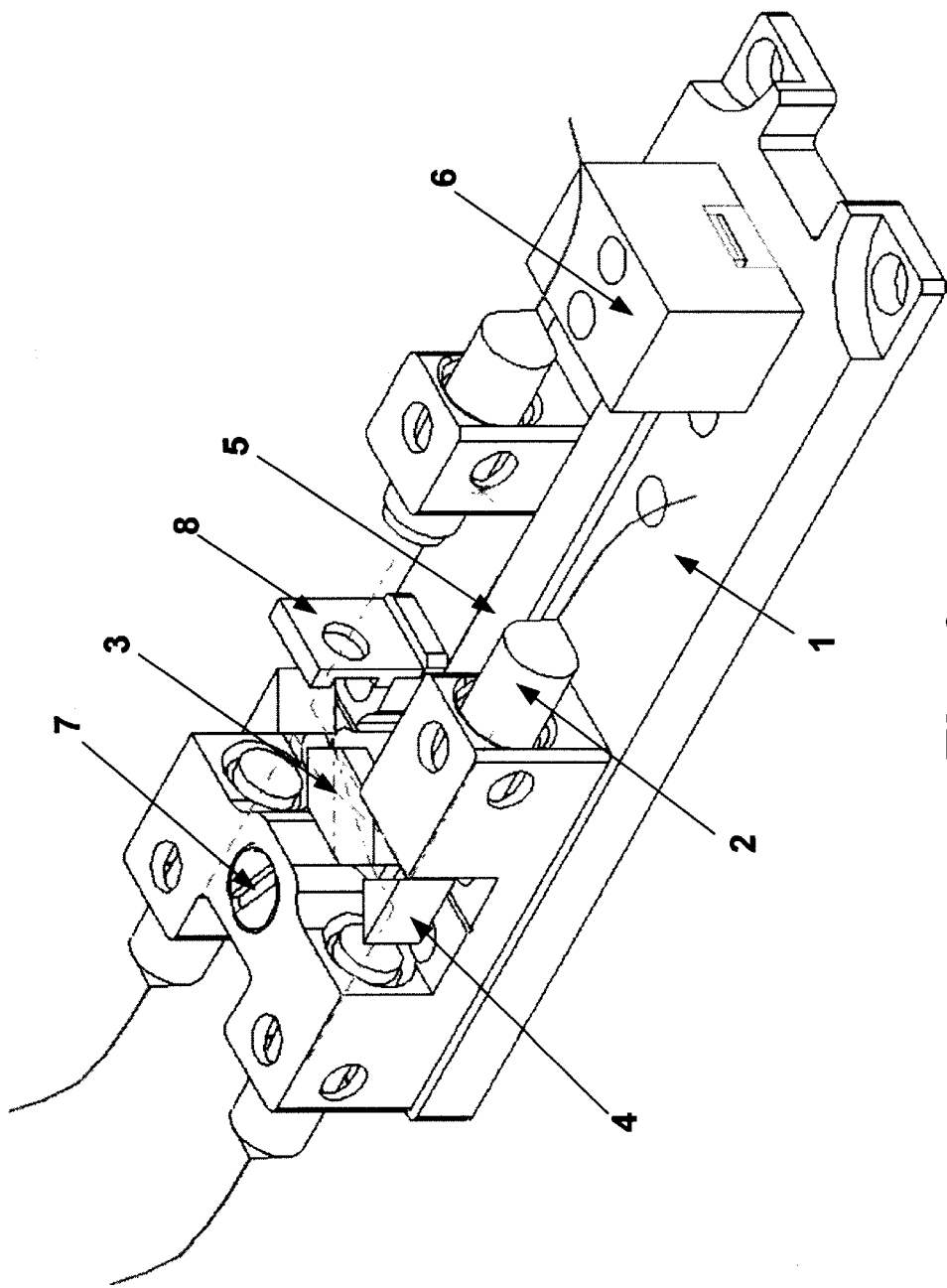
FIG. 2 is a pictorial diagram illustrating an optical add/drop module to achieve the add/drop function by actuating a hexagonal prism bonded on top of a piezo-actuator surface in accordance with the present invention.

FIG. 2 is a pictorial diagram illustrating the OADM base 20 for achieving the add/drop function by actuating a hexagonal prism bonded on top of a piezo-actuator surface. The triangular prism 31 is aligned on and placed into the OADM base 20 from the extension of the first, second, and third cylindrical pins 12a, 12b, and 12c through the OADM base 20. The triangular prism 32 is aligned on and placed into the OADM base 20 from the extension of the fourth, fifth, and sixth cylindrical pins 13a, 13b, and 13c through the OADM base 20. The hexagonal prism 33 is aligned and placed into the OADM base 20 from the extension of the second, fifth, and seventh cylindrical pins 12b, 13b, and 13d. A bimorph actuator 21 is aligned and mounted into the OADM base 20 from the extension of the eight and ninth cylindrical pins 14a and 14b.

Collimators 22 and 23 extend horizontally relative to the OADM base 20. Although the collimators 22 and 23 are actively aligned, the precision positions of the prisms 31, 32, and 33 are necessary for the module to be assembled.

Figure 3:
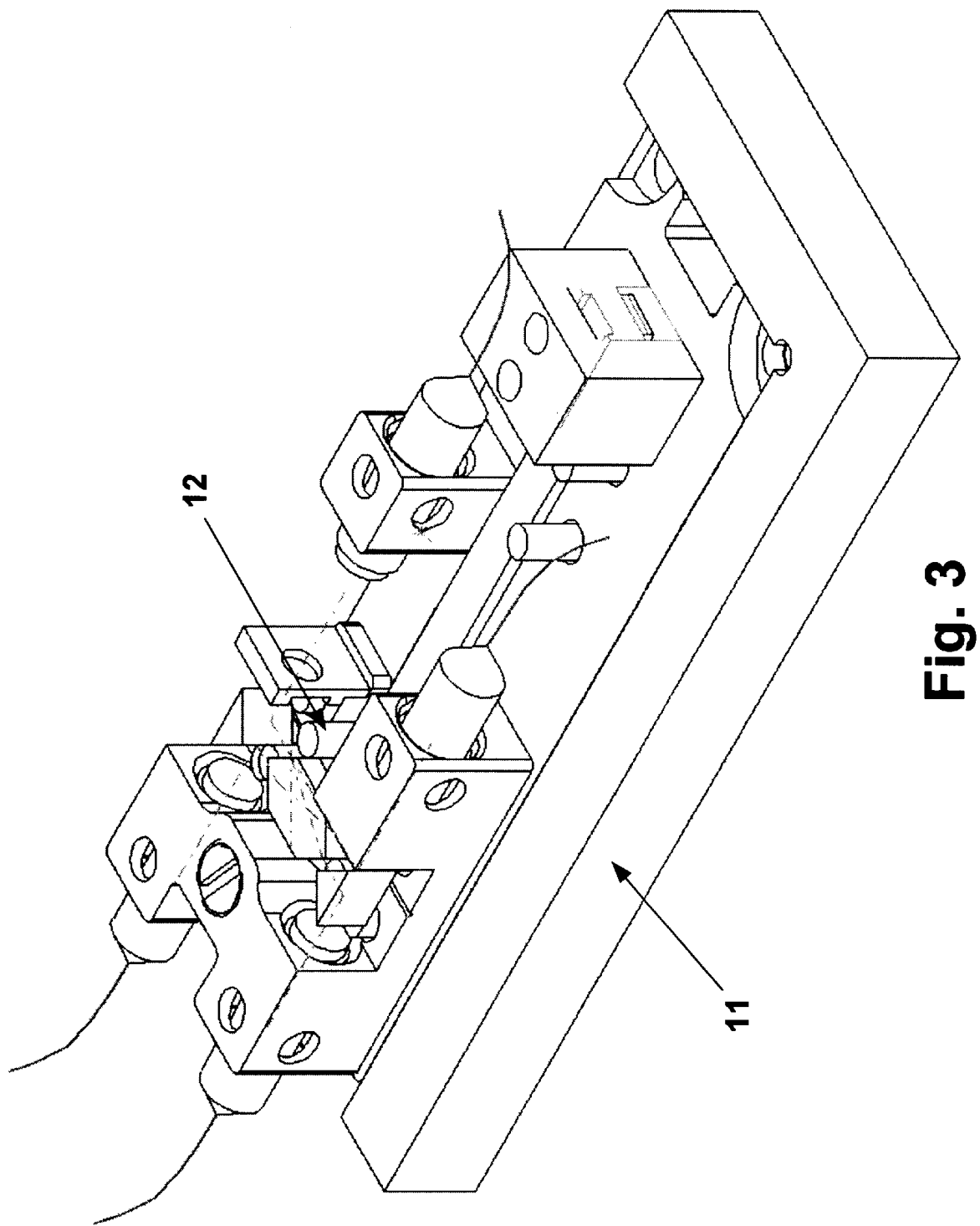
FIG. 3 is a pictorial diagram illustrating an optical add/drop module on an assembly base in accordance with the present invention.

FIG. 3 is a pictorial diagram illustrating the OADM module 20 mounted on the assembly base 10. The OADM module 20 is mounted on the assembly base 10 for alignment and placement of the first triangular prism 31, the second triangular prism 32, and the third hexagonal prism 33.

The above embodiments are only illustrative of the principles of this invention and are not intended to limit the invention to the particular embodiments described. For example, although three sets of cylindrical pins are used to alignment of a triangular prism, a hexagonal prism, or a bimorphs actuator, one of ordinarily skill in the art should recognize that additional sets of cylindrical pins may be added for alignment of optical components without departing from the spirits of the present invention. Furthermore, although three pins are selected to represent a first set of cylindrical pin, it is apparent to one of ordinary skill in the art would recognize that less number of cylindrical pins, or more number of cylindrical pins, may be used for alignment of an optical device. Other variations and approximations in the deviation of the reflected beam can be practiced without departing from the spirits in the present invention. Accordingly, various modifications, adaptations, and combinations of various features of the described embodiments can be practiced without departing from the scope of the invention as set forth in the appended claims.

I claim:

1. An optical platform for housing an optical add/drop module, comprising:

an assembly base having a first set of register pins and a second set of register pins, the first set of register pins having a first register pin, a second register pin, and a third register pin, the second set of register pins having a fourth register pin, a fifth register pin, a sixth register pin, and seventh register pin, the combination of the first, second, and third register pins define the position of a first triangular prism, the combination of the fourth, fifth, and sixth register pins define the position of the second triangular prism, the combination of the second, fifth, and seventh define the position of a hexagonal prism, and an optical add/drop module base, mounted on top of the assembly base.

2. The optical platform of claim 1, wherein the first, second, and third pins are tangential to the two sides of the first triangular prism that form a right angle.

3. The structure of claim 2, the alignment positions for the first and second triangular prisms, and the hexagonal prism are established when the OADM base is mounted over the assembly base.

4. The structure of claim 2, the alignment of the bimorph actuator is established when the OADM base is mounted over the assembly base.

5. The optical platform of claim 4 further comprising a third set of register pins, the third set of register pins and ninth register pins define the position of a bimorph actuator.

6. The optical platform of claim 2, wherein each of the first, second, and third pins having first and second ends, the first ends of the first, second, and third cylindrical pins extending through the holes in the OADM base, the surfaces of the portions of the first, second, and third cylindrical pins that extend through the holes in the OADM base being in contacts with the triangular prism.

7. The optical platform of claim 2, wherein each of the fourth, fifth, sixth, and seventh pins having first and second ends, the first ends of fourth, fifth, sixth, and seventh cylindrical pins extending through the holes in the OADM base, the surfaces of the portions of the fourth, fifth, sixth, and seventh cylindrical pins that extend through the holes in the OADM base being in contacts with the triangular prism.

8. The optical platform of claim 2, wherein each of the second, fifth, and seventh pins having first and second ends, the first ends of the second, fifth, and seventh cylindrical pins extending through the holes in the OADM base, the surfaces of the portions of the second, fifth, and seventh cylindrical pins that extend through the holes in the OADM base being in contacts with the hexagonal prism.

9. The optical platform of claim 2, wherein the eighth and ninth cylindrical pins having first and second ends, the first ends of the eighth and ninth cylindrical pins extending through the holes in the OADM base, the surfaces of the portions of the eighth and ninth cylindrical pins that extend through the holes in the OADM base in contacts with a side of the bimorph actuator.

* * * * *